(12) United States Patent
Yukawa et al.

(10) Patent No.: US 6,909,798 B1
(45) Date of Patent: Jun. 21, 2005

(54) METHOD OF ERASING REPEATED PATTERNS AND PATTERN DEFECT INSPECTION DEVICE

(75) Inventors: Noriaki Yukawa, Osaka (JP); Hajime Kawano, Osaka (JP); Yukihiro Ayaki, Suita (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 477 days.

(21) Appl. No.: 09/629,141

(22) Filed: Jul. 31, 2000

(30) Foreign Application Priority Data

Aug. 2, 1999 (JP) .......................................... 11-218606

(51) Int. Cl.$^7$ ................................................ G06K 9/00
(52) U.S. Cl. ...................... 382/141; 382/173; 382/274; 382/218; 356/237.4
(58) Field of Search ................................ 382/274, 141, 382/144, 145, 149, 173, 219, 267, 190, 218; 250/559.44, 559.33; 356/394, 237.4, 380, 393, 237.5, 237.2

(56) References Cited

U.S. PATENT DOCUMENTS

| | | | | |
|---|---|---|---|---|
| 5,185,812 A | * | 2/1993 | Yamashita et al. | 382/145 |
| 5,717,780 A | * | 2/1998 | Mitsumune et al. | 382/141 |
| 6,005,978 A | * | 12/1999 | Garakani | 382/218 |
| 6,222,935 B1 | * | 4/2001 | Okamoto | 382/172 |
| 6,252,981 B1 | * | 6/2001 | Guest et al. | 382/170 |
| 6,347,150 B1 | * | 2/2002 | Hiroi et al. | 382/149 |
| 6,539,106 B1 | * | 3/2003 | Gallarda et al. | 382/286 |

* cited by examiner

Primary Examiner—Bhavesh M. Mehta
Assistant Examiner—Sheela Chawan
(74) Attorney, Agent, or Firm—Greenblum & Bernstein, P.L.C.

(57) ABSTRACT

An image of a subject of inspection is picked up, and this image is demarcated into a plurality of areas. Density differences are found between reference pixels and a plurality of comparison pixels in the demarcated areas, and a density difference that is closest to 0 is determined as a specific density difference. The specific density difference is then applied to the reference density in the image of the subject, whereby repeated patterns in the image are erased.

6 Claims, 6 Drawing Sheets

METHOD OF ERASING REPEATED PATTERNS AND PATTERN DEFECT INSPECTION DEVICE

BACKGROUND OF THE INVENTION

1. Technical Field of the Invention

The present invention relates to a method of erasing repeated patterns and to a pattern defect detection device in image processing when detecting pattern defects contained in electronic equipment devices such as liquid crystal panels, plasma display panels, or semiconductor wafers.

2. Description of Related Art

Conventionally, inspection of pattern defects in the manufacture of electronic equipment devices such as liquid crystal panels, plasma or display panels or semiconductor wafers was performed by visual inspection by human beings or by automatic image processing carried out by machine.

In the case of visual inspection, alterations in the type of electronic equipment being inspected can easily be coped with, and start-up is rapid, but there are the drawbacks that identifying the precise positions of defects takes time and throughput is poor. Maintaining and standardizing detection sensitivity is also a problem.

In contrast, in the case of image processing using a machine, although there are the advantages that rapid identification of the precise positions of defects and maintenance and standardization of the detection sensitivity can be achieved, there was the problem that considerable time was required for adjustment in the event of alterations in the type of electronic equipment being manufactured.

With increases in the structural fineness and performance of components in recent years, the poor throughput of visual inspection has become increasingly prominent. There are therefore considerable expectations in regard to improvement of performance of machines that perform image processing.

However, although the structural fineness and performance of electronic equipment devices such as liquid crystal panels, plasma or display panels and semiconductor wafers has considerably increased, these devices are often formed with a large number of repeated patterns identical to a partial pattern. To detect defects in such repeated patterns, conventionally, processing was performed as follows.

Firstly, pattern erasure is performed as described below by performing the processing:

gout=gin−g(in+size)+offset on all the pixels of the raw image, including the imaged repetition pattern, that are within the processing region, with the standard pitch of the repetition pattern. Here, gout is the density of the pixels of the image after processing, gin is the density of the pixels of the raw image, g (in+size) is the density of a pixel separated by the standard pitch from the pixel chosen as the origin of the raw image, and offset is the density that is added as a reference density in the image after processing; in the case of 8-bit 256 gradations, this is usually the central 128 gradations. This processing is called pattern erasure processing; the image obtained by this processing is called the background image or image after pattern erasure processing.

Secondly, pixels whose density differs considerably from the background density of the background image are detected as defects. This processing is called defect detection processing.

The description will now be continued with reference to FIG. 5A and FIG. 5B. FIG. 5A shows the raw image prior to pattern erasure processing, in which an elongate pattern is repeated. FIG. 5B shows the image after pattern erasure processing. The 21 pixels that are closest to the pattern pitch are taken as constituting the size in the expression given above for pattern erasure processing. Processing is performed in the range of processing region 50 illustrated in FIG. 5A.

Also, at the bottom of FIG. 5A and FIG. 5B, there are shown the density profiles 53 and 54 on the check lines 51, 52 respectively on the raw image prior to pattern processing and the image after processing. The direction of increased brightness is the direction of approach to gradation number 255; the direction of decreasing brightness is the direction approaching gradation 0. Whether or not the pattern has been erased after processing can be ascertained by comparing the density profiles 53 and 54.

Defect detection processing consists detecting as a defect satisfaction of certain density conditions in the image after processing illustrated in FIG. 5B. Taking as an example the density profile 54 on check line 52, if a density gradation of more than the specific density gradation 135 is deemed to constitute a white defect and a density gradation of less than specific density gradation of 120 is deemed to constitute a black defect, 55 is detected as a black defect.

However, in the above conventional pattern erasure processing, there are the following three problems.

Firstly, normal portions of the pattern are left in the background image.

Secondly, although they might originally be white defects or black defects, when both white defects and black defects occur in the background image, it becomes difficult to distinguish which kind of defects they originally were.

Thirdly, processing of the peripheral pattern cannot be performed normally.

These are now described in detail below.

The first problem does not arise if the pattern pitch is an integer at all locations. However, it is impossible for the pitch to be the same over the entire raw image.

This is because, when image pickup is effected through a large number of lenses employed for image input, due to the effects of lens aberration, image pickup cannot be effected at exactly the same pitch in the center and periphery of the lenses. Also, it is difficult to make this an integer value with no error at all. Examples are the residual portions 58 and 59 of FIG. 5B.

The second problem is a phenomenon that may occur due to comparison before and after. The white defect 56 in the middle of the processing region 50 of FIG. 5A appears as defect portions 56 and 57 in FIG. 5B which are of higher density and lower density than the background density. The distance between pixel 56 and pixel 57 is of course the size of the pattern erasure processing. It is therefore impossible to tell simply from an individual defect portion, whether the original defect was a white defect or a black defect.

The third problem, like the second problem is a phenomenon that may occur due to comparison before and after. When pattern erasure processing is performed over the entire input image, as shown in FIG. 6A and FIG. 6B, a region 60 corresponding to the size of the pattern erasure processing on the right hand side of the region cannot be obtained as a result of normal processing. This is because there are no comparison pixels.

SUMMARY OF THE INVENTION

An object of the present invention is to solve the above problems and to provide a method of erasing repeated patterns in which inspection of defects in a repeated pattern can be performed without problems.

A method of erasing repeated patterns according to the present invention comprises, in a dark/light image obtained by image pickup of a subject of inspection, when identifying defects present in a repeated pattern in a subject of inspection, a step of detecting a plurality of density differences in which the density differences are found between reference pixels separated by values of a predetermined reference size and sizes which are integral multiples thereof and a plurality of comparison pixels, a step of determining a specific density difference wherein the density difference that is closest to 0 or the mean density difference from a plurality of density differences is detected as specific density difference, and a pattern-erased image generation step in which the specific density difference is applied to the reference density in the pattern-erasure image; by detecting the specific density differences using the density differences with respect to a plurality of comparison pixels, the problems mentioned above are eliminated and a repeated pattern can be suitably erased without using a complicated algorithm.

Also, a pattern defect inspection device according to the present invention comprises an image pickup element that picks up an image of an inspection subject and a processing device that detects pattern defects by storing and processing dark/light image data obtained by image pickup of the inspection subject wherein the processing device comprises: a portion for detecting a plurality of density differences in which the density differences are found between reference pixels separated by a pre-determined reference size and sizes which are integral multiples thereof and a plurality of comparison pixels; a specific density difference determining portion wherein the density difference that is closest to 0 from a plurality of density differences is detected, a pattern-erased image generation portion in which the specific density difference is applied to the reference density in the pattern-erasure image; and a defect detection portion; thus the repeated pattern can be erased and pattern defects detected in a suitable way as described above.

Other and further objects, features and advantages of the invention will appear more fully from the following description.

DESCRIPTION OF PREFERRED EMBODIMENTS

An embodiment in which a repeated pattern erasure method and pattern defect inspection device according to the present invention are applied to inspection of an electrode wiring glass panel in a liquid crystal array panel is described below with reference to FIG. 1 to FIG. 4.

Figure 1:
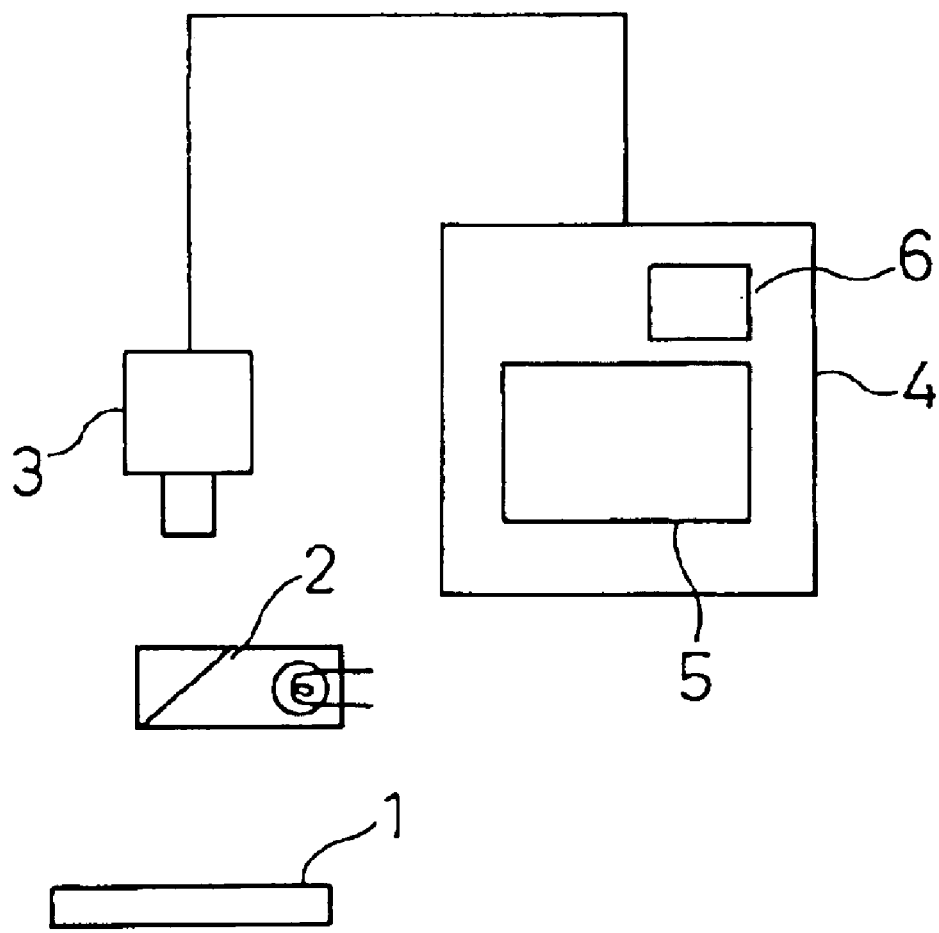
FIG. 1 is a layout diagram of a pattern defect inspection device wherein an embodiment of a method of erasing repeated patterns according to the present invention is applied.

In FIG. 1, which illustrates diagrammatically the construction of a pattern defect inspection device according to the present invention, the subject of inspection 1 is arranged in a prescribed position and is supplied with illumination by downward illumination 2, and an image thereof is picked up by an image pickup element comprising a CCD area sensor etc. The image data from the sensor pixels in image pickup element 3 is transferred, in one-to-one correspondence, to image memory 5 in a computer 4 constituting a processing device. The image data transferred into this image memory 5 is read to computer 4 and a processing program 6 is stored that performs prescribed processing. The image density is processed in 256 gradations, namely, 0 to 255.

Figure 2:
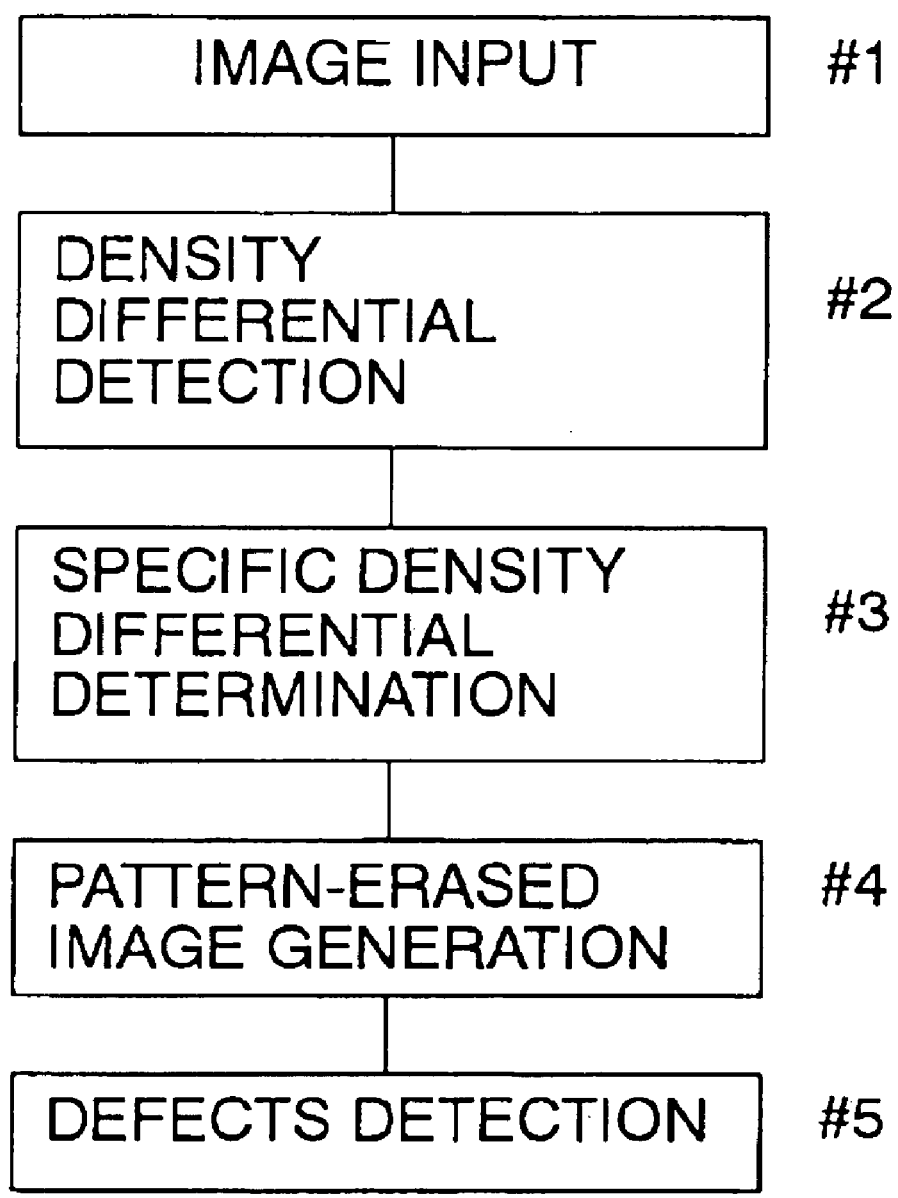
FIG. 2 is a processing flow chart of a repeated pattern erasure method according to the above embodiment.

FIG. 2 shows the flow of processing of the method of detection of defects by repeated pattern erasure. In FIG. 2, first of all, in image input step No. 1, the image data that is obtained from image pickup element 3 is stored in image memory 5 of computer 4. Next, in a plurality of density difference detection steps of step No. 2, the following processing is performed with the size (21 pixels) found beforehand from the pattern pitch. The density differences between reference pixels and a plurality of comparison pixels separated by a value of an integral multiple of the aforesaid size are thereby found.

$$gout\text{-}n = gin\text{-}g\ (in+size*n) \quad \ldots (1)$$

Figure 3:
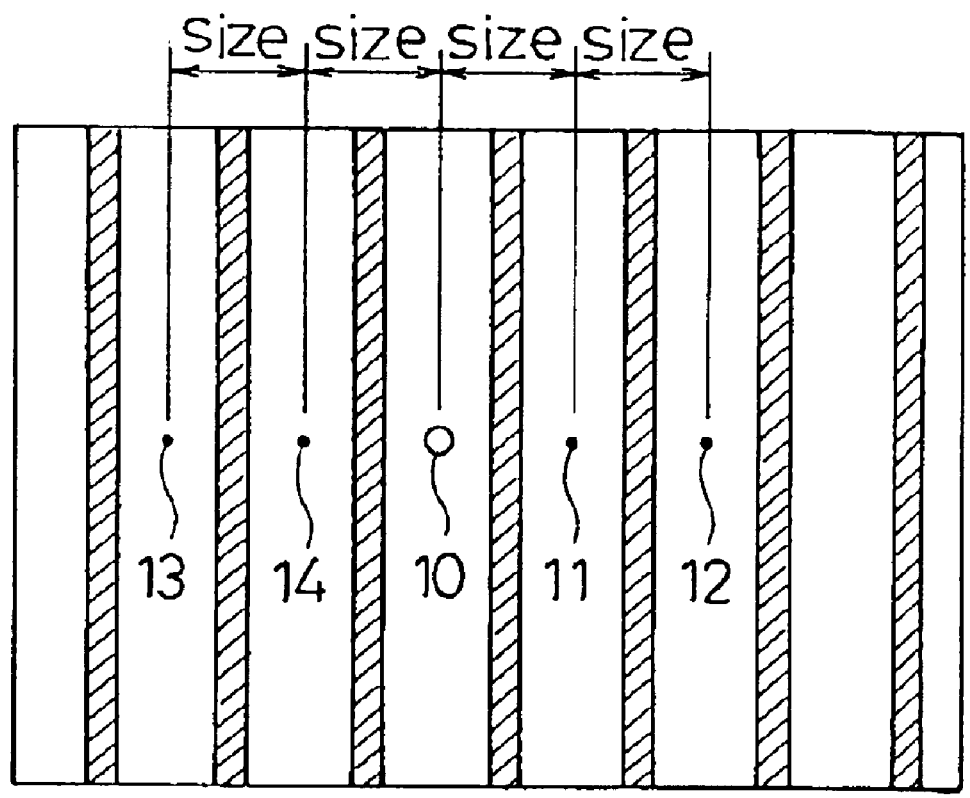
FIG. 3 is a diagram of filter elements in this embodiment.

The reference pixels and comparison pixels are called filter elements. FIG. 3 shows the relationship of filter elements at the positions of particular reference pixels. Reference pixels 11, 12, 13, 14 are set up that are separated by values of integral multiples of the size with respect to reference pixel 10. Four density differences are obtained by expression (1). These are designated gout-1, gout-2, gout-3 and gout-4.

Next, in the specific density difference determination step of step No. 3, the final output densities are determined from the four density differences gout-1, gout-2, gout-3, and gout-4 of expression (1). In the case where the object is pattern erasure, the value of these values which is closest to 0 is selected. For example, if gout-1=3, gout-2=−2, gout-3= 10, and gout-4=−9, gout-2 is selected as the specific density difference.

Next, in the erased image generation step of step No. 4, the specific density difference found in the specific density difference determination step is added to the reference density in the pattern erasure image. The reference density is determined in the same way as the offset described in the prior art example; in the case of 256 8-bit gradations of 0 to 255, the reference density will often be gradation 128.

Figure 4A:
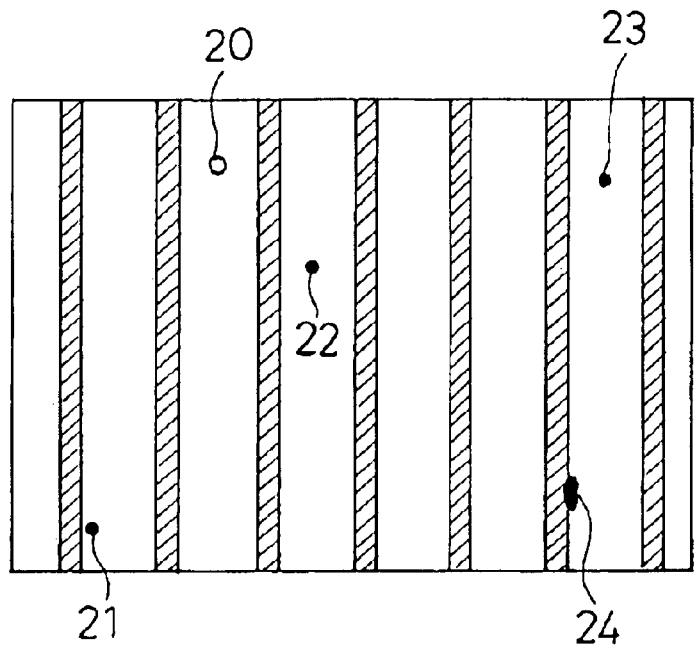
FIG. 4A and FIG. 4B are diagrams of images before and after processing in this embodiment.
Figure 4B:
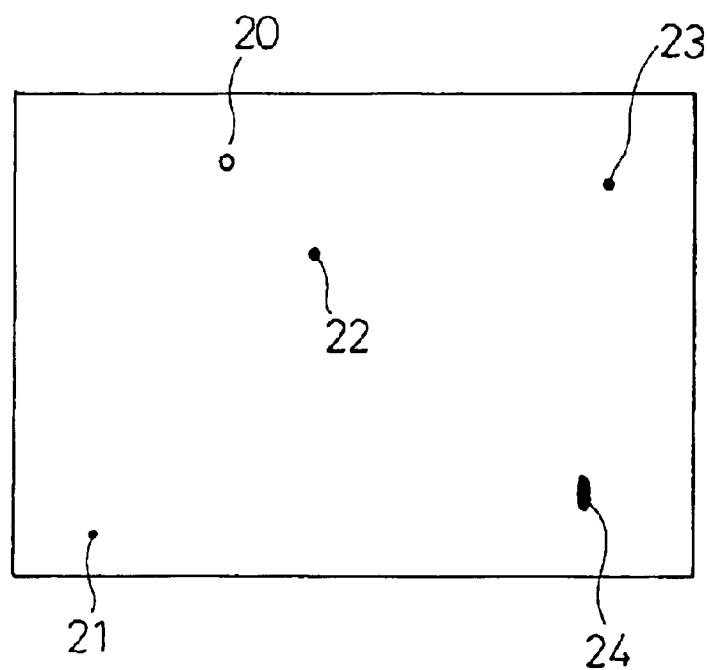
Figure 5A:
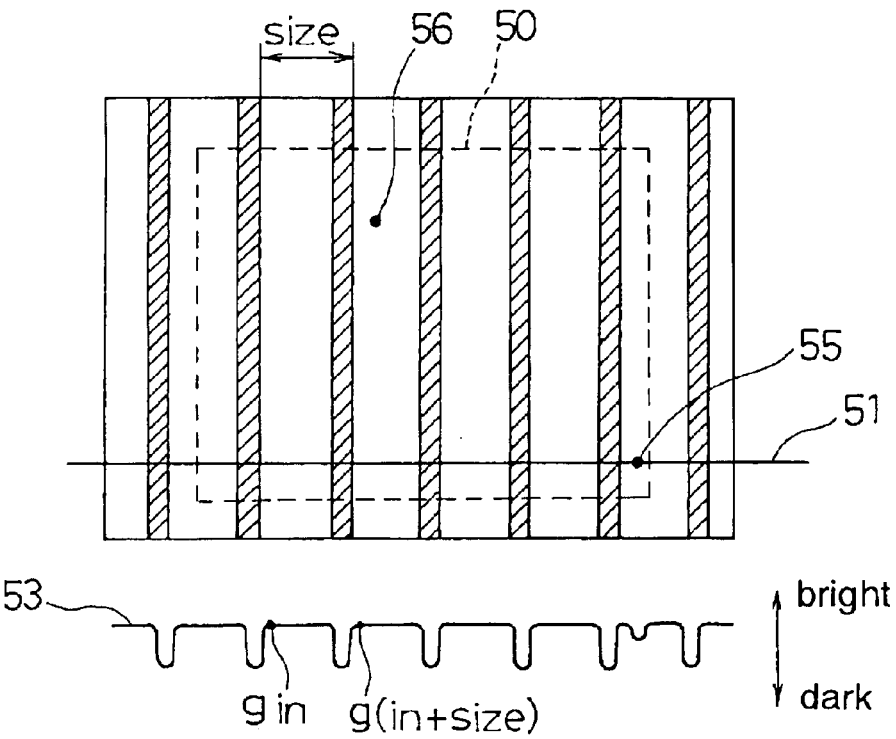
FIG. 5A and FIG. 5B are diagrams of images before and after processing by a repeated pattern erasure method according to a prior art example.
Figure 5B:
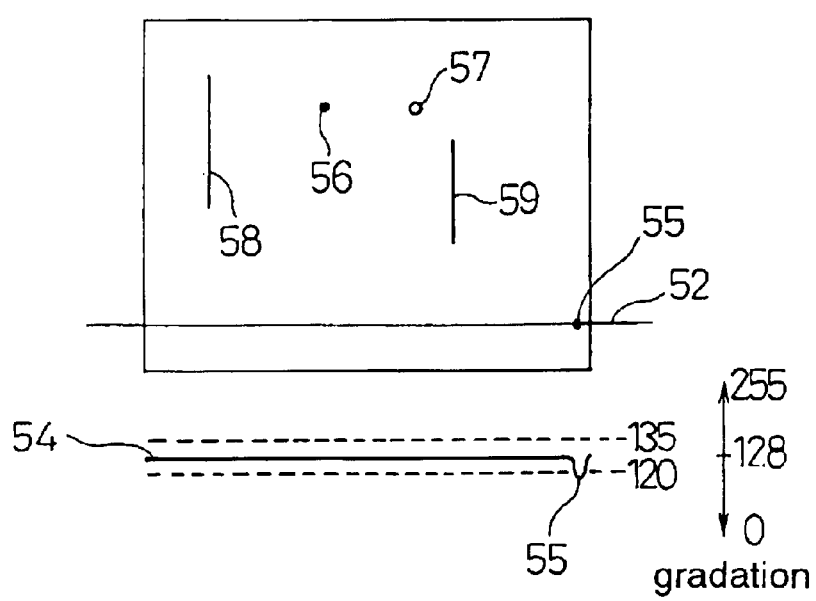
Figure 6A:
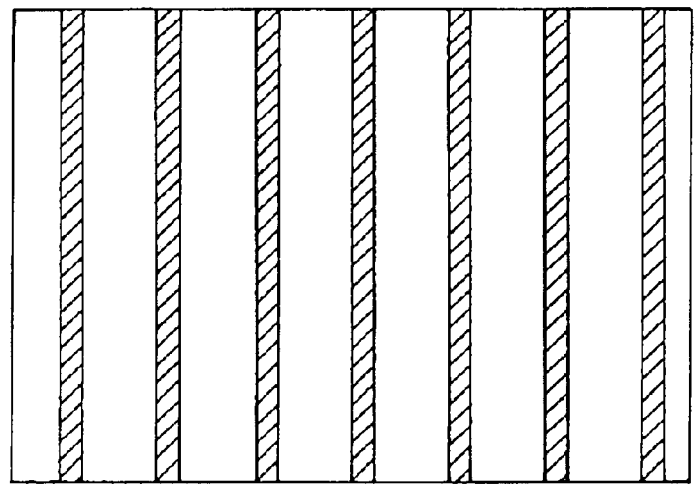
FIG. 6A and FIG. 6B are diagrams of images before and after processing illustrating a region which is incapable of being processed in the prior art example.
Figure 6B:
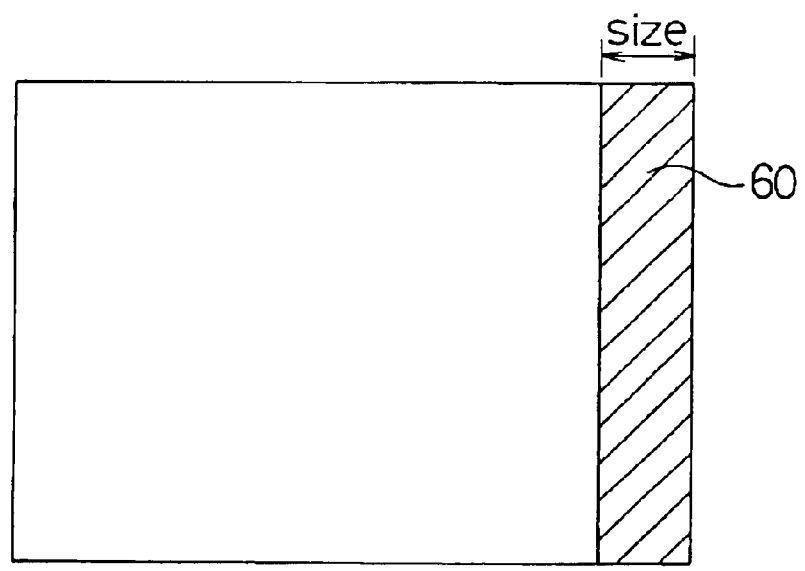

FIG. 4A is an image which has a repeated elongated pattern prior to pattern erasure processing and FIG. 4B is the image after processing. Even if processing is performed on the entire input image area, the first to third problems of the prior art example are solved. White defect 20 and black defects 21, 22, 23, and 24 respectively appear in the image after processing as an independent white defect and independent black defects. Also, normal processing can be performed over the entire area of the image and the pattern can be reliably erased.

Although, in the description of the above embodiment, in the step of determining the specific density difference, the specific density difference that was closest to 0 was selected, depending on the circumstances, the mean value of a plurality of density differences could be selected as the specific density difference.

Since, with the method of erasing repeated patterns and pattern defect inspection device according to the present invention, there are provided a step of detecting a plurality of density differences in which the density differences are found between reference pixels separated by the value of a reference size which was previously found as described above and values of integral multiples thereof and a plurality of comparison pixels, a step of determining a specific density difference wherein the density difference that is closest to 0 or the mean density difference is detected as specific density difference from a plurality of density differences, and a pattern-erased image generation step in which the specific density difference is applied to the reference image of the pattern-erasure image, the problems of the prior art are solved, and, without using a complicated algorithm, the repeated pattern can be suitably erased, making it possible to detect pattern defects.

Although the present invention has been fully described in connection with the preferred embodiment thereof, it is to be noted that various changes and modifications apparent to those skilled in the art are to be understood as included within the scope of the present invention as defined by the appended claims unless they depart therefrom.

What is claimed is:

1. A method of erasing repeated patterns in a dark/light image obtained by image pickup of a subject of inspection, when identifying defects present in a repeated pattern in the subject of inspection, comprising:

detecting a reference pixel in the obtained image;

assigning a comparison pixel at a predetermined distance from the reference pixel, the distance being determined in accordance with the pattern pitch of the repeated patterns in the dark/light image;

obtaining a plurality of density differences between said reference pixel and each of said comparison pixels, wherein when a density of the reference pixel is larger than a density of the comparison pixel, a density difference is positive, and when the density of the reference pixel is smaller than the density of the comparison pixel, the density difference is negative;

determining the density difference that is closest to 0 as a specific density difference; and applying said specific density difference to a reference density of the image, thereby erasing the repeated patterns in the dark/light image to identify defects in a pattern-erased image.

2. The method of erasing repeated patterns in a dark/light image according to claim 1, wherein, in the step of determining the specific density difference, a mean value of the plurality of density differences between the reference pixel and the comparison pixels is determined as the specific density difference.

3. The method of erasing repeated patterns in a dark/light image according to claim 1, wherein, instead of determining the density difference that is closest to 0 as the specific density difference, a mean value of the plurality of density differences between the reference pixel and the comparison pixels is determined as the specific density difference.

4. The method of erasing repeated patterns in a dark/light image according to claim 1, wherein the distance between the comparison pixel and the reference pixel is an integral multiple of the pattern pitch of the repeated patterns.

5. A pattern defect inspection device comprising:

an image pickup element that picks up an image of a subject of inspection;

a processing device that detects pattern defects by storing and processing dark/light image data obtained by image pickup of the inspection subject, wherein the processing device detects a reference pixel in the obtained image, assigns a comparison pixel at a predetermined distance from the reference pixel, the distance being determined in accordance with the pattern pitch of the repeated patterns in the dark/light image, and obtains a plurality of density differences between said reference pixel and each of said comparison pixels, wherein when a density of the reference pixel is larger than a density of the comparison pixel, a density difference is positive, and when the density of the reference pixel is smaller than the density of the comparison pixel, the density difference is negative;

a unit for determining a density difference that is closest to 0 as a specific density difference; and a unit for applying the specific density difference to a reference density of the image and generating a pattern-erased image to identify defects in the pattern-erased image.

6. The pattern defect inspection device according to claim 5, wherein the distance between the comparison pixel and the reference pixel is an integral multiple of the pattern pitch of the repeated patterns.

* * * * *